Patented Nov. 26, 1935

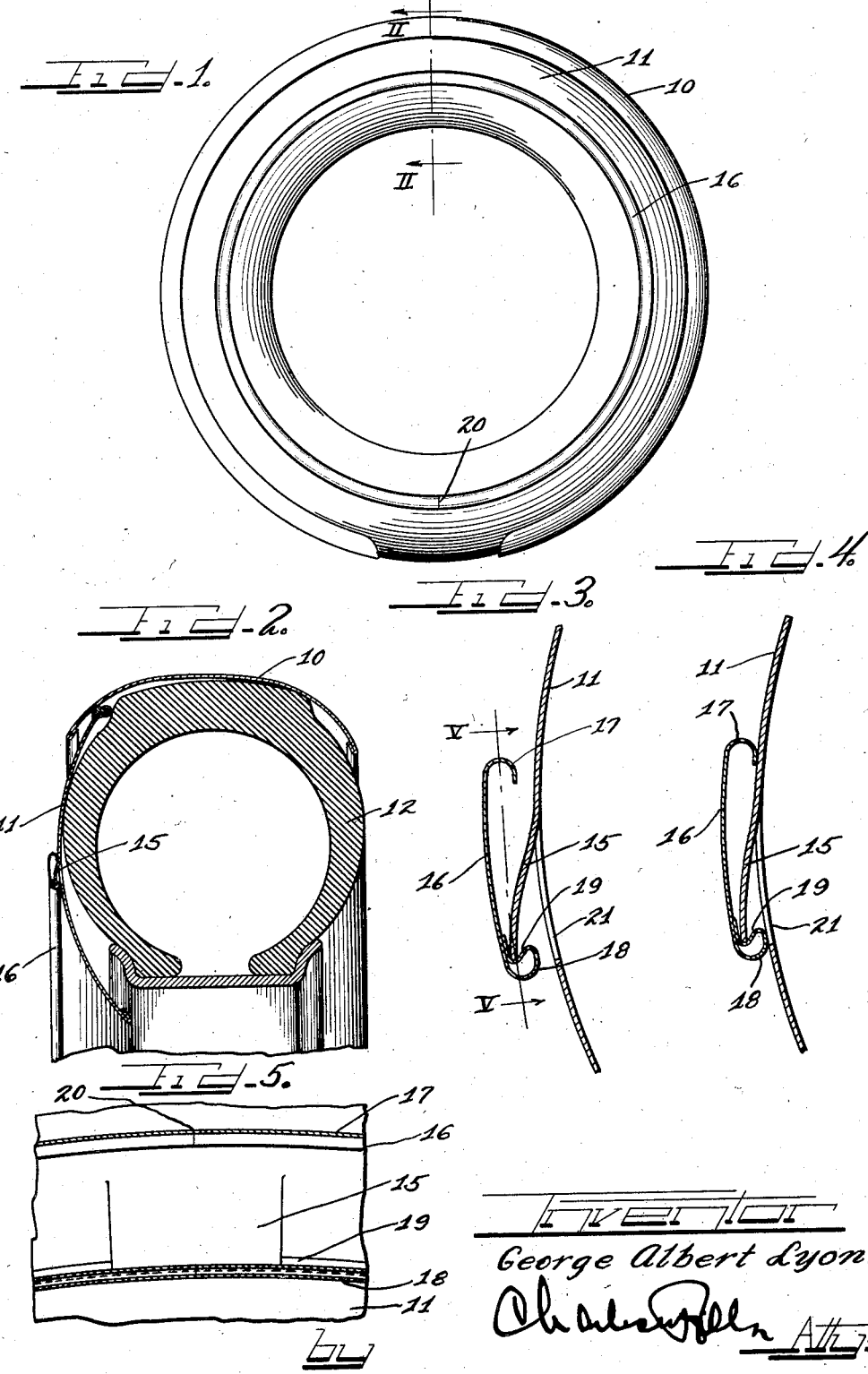

2,022,127

UNITED STATES PATENT OFFICE 2,022,127

BEADED TIRE COVER

George Albert Lyon, Allenhurst, N. J., assignor to Lyon Incorporated, Detroit, Mich., a corporation of Delaware Application June 12, 1933, Serial No. 675,347

11 Claims. (Cl. 41—10)

This invention relates to a beaded construction and more particularly to a beading construction for tire covers and the like.

It is an object of this invention to provide a beading construction wherein a beading strip may be applied to a member to be ornamented or strengthened without requiring the use of any fastening elements, such as bolts, rivets or the like.

Another object of the invention is to provide a beading strip and supporting elements therefor on the member to which the strip is to be applied, the elements and strip being so arranged that the strip may be readily applied to the member to be ornamented by merely hooking it over the free ends of the elements and thereafter pressing it into tight cooperation with the adjoining surface of the member being ornamented.

In accordance with the general features of this invention, there is provided a planar member to be ornamented, such, for example, as the side covering portion of a tire cover, having a plurality of outwardly slanting tangs projecting therefrom and arranged in the form of a circle and an annular beading strip hooked over the free ends of the tangs and pressed inwardly toward the member to interlock the tangs and strip.

The beading strip is preferably split so that it may be progressively hooked over the tangs arranged in the form of a circle. It is also of such width as to cover the slots in the planar member formed by the striking of tangs therefrom.

Other objects and features of this invention will more fully appear from the following detail description taken in connection with the accompanying drawing which illustrates a single embodiment thereof, and in which Figure 1 is a side view of a tire cover having my novel beading construction applied thereto;

Figure 2 is an enlarged fragmentary sectional view taken on the line II—II of Figure 1, looking in the direction indicated by the arrows and showing the cover applied to a spare tire;

Figure 3 is a fragmentary enlarged sectional view taken through the component parts of my novel beading construction and showing the beading strip in the process of being applied to the retaining tangs;

Figure 4 is a sectional view similar to Figure 3, showing the beading strip in its ultimate position wherein it is secured to the side covering portion by the spaced resilient tangs; and Figure 5 is a fragmentary sectional view taken on line V—V of Figure 3, looking in the direction indicated by the arrows and showing how the tangs are arranged so that one of the tangs overlaps the ends of the split beading strip.

The reference character 10 designates generally a circular resilient split rim for cooperation with an annular side plate 11. These two cover parts comprise the components of the well-known Lyon tire cover such, for example, as is disclosed in my U. S. Letters Patent No. 1,807,697 which issued June 2nd, 1931. It is, of course, to be understood that while I have illustrated my novel beading construction as being applied to a tire cover of the Lyon type, the invention is not to be thus limited but only insofar as defined by the scope and spirit of the appended claims. In Figure 2, the cross sectional shape of the tire cover is clearly illustrated and the cover is shown as being applied to a spare tire designated generally by the reference character 12.

The side covering plate or portion 11 is of annular shape and is also substantially planar in that it may be laid on a flat surface in a position substantially parallel thereto. This member 11 has struck therefrom a plurality of spaced tangs or projections 15 arranged in the form of a circle. These tangs are each of a shape and construction shown in Figs. 3, 4 and 5. These tangs are each yieldable or resilient on account of the fact that the side covering portion 11 is made preferably of sheet metal.

These tangs or projections 15 are adapted to receive and hold in place an annular beading strip 16 which is preferably split so that it may be progressively hooked over the free ends of the downwardly slanting tangs 15. The beading strip is made of any suitable material, but is preferably made of sheet metal such, for example, as stainless steel and may be suitably finished or plated to provide the desired contrast with the tire cover. The upper edge of the circular strip 16 is turned inwardly upon itself as indicated at 17 to provide a rounded or turned edge. The other or inner side of the strip 16 is turned back upon itself at 18 to provide a rounded edge and a U-shaped flange 19 disposed between the rounded edge 18 and the body of the strip proper. This U-shaped flange 19 defines a reentrant pocket into which the free ends of the tangs 15 are adapted to be disposed when the bead is progressively hooked over the tangs.

By making the beading strip split, as indicated at 20 in Figure 5, it is possible to progressively spring or hook the U-shaped flange 19 of the beading strip over the free ends of the spaced tangs 15. Also, the beading strip should be so arranged with reference to the tangs that one of the tangs 15 will overlap both of the ends of the beading strip as is clearly shown in Figure 5.

Moreover, the beading strip 16 should be of such width as to cover the slots 21 formed in the covering portion 11 when the tangs 15 are struck or blanked therefrom. It will be noted from Figure 4, that the rounded edge 18 is so disposed with respect to the innermost extremity of each of the slots 21 as to render such slots invisible when the beading strip is in its ultimate position on the side covering portion.

I also find that it is advantageous to slightly bow or curve each of the tangs 15 whereby such tangs may yield as the beading strip is pressed inwardly from the position shown in Figure 3 toward the plate 11 and into the final position shown in Figure 4. It will of course be evident that during this pressing operation the free ends of the tangs 15 are caused to firmly bite into the surface of the U-shaped flange 19 and to interlock the bead to the tangs whereby the beading strip is held in tight cooperation with the outer surface of the side plate 11.

This beading construction is obviously more economical than beading constructions heretofore used, wherein bolts and rivets were employed to secure the beading strip on the rivets to be ornamented or strengthened by the strip.

Now I desire it understood that, while I have illustrated and described in detail the preferred embodiment of this invention, the invention is not to be thus limited but only insofar as defined by the scope and spirit of the appended claims.

I claim as my invention:

1. In ornamental structure of the class described, supporting means, bead retaining means projecting in an arcuate formation from said supporting means, a longitudinally arcuate bead having complemental retaining means in an arcuate formation formed to be interlocked with the aforesaid retaining means, one of said retaining means being distortable and distorted by said bead and supporting means into a different arcuate formation into interlocking biting engagement with the other retaining means as said bead and supporting means are forced toward each other.

2. In ornamental structure of the class described, a supporting member comprising a tire cover or the like, a molding retaining means projecting from said member in a longitudinally curved form, longitudinally curved molding means for said member and formed to be positioned in interlockable relation with the retaining means, one of said means being distortable so as to interlock with the other means when one of said means is forced toward the supporting member, both of said means extending longitudinally throughout more than 180° so as to maintain the interlocked relation.

3. In combination, a support member, a longitudinally curved molding member therefor, one of said members having radially distortable retaining tangs in a series more than 180° in extent and the other member being formed to receive said tangs when distorted, said members being constructed and arranged to be interlocked through said tangs by distortion of said tangs into biting engagement with said other member, as said members are forced together by relative axial movement into assembled relation.

4. In combination, a support member, a longitudinally curved molding member therefor, one of said members having radially distortable retaining tangs in a series more than 180° in extent and arranged to be distorted into an arc of a different radius so as to retain the different shape, the other member being formed to receive the tangs when so distorted, said members being constructed and arranged to be interlocked through said tangs by distortion of said tangs into said other member as said members are forced together by relative axial movement into assembled relation.

5. In combination, a support member having longitudinally curved retaining means, a longitudinally curved molding member therefor, having co-operative retaining means at one margin, one of said means being distortable toward the other means into a different radial shape as said members are forced together into assembled relation and formed to remain distorted while said members are assembled, said molding member being connected to said support member solely by said means.

6. A method of applying a longitudinally arcuate and recessed bead to a longitudinally arcuately recessed tire cover or the like support, comprising the steps of placing the bead and support with their recesses concentric and forcing said support and bead axially against each other by pressure applied to the outer side of the bead and at the same time bending a wall of one of said recesses into the other recess.

7. A method of applying a longitudinally arcuate and recessed bead to a longitudinally arcuately recessed tire cover or the like support, comprising the steps of placing the bead and support with their recesses concentric and with a wall of one recess disposed in the other recess so as to mount said bead on said support, and forcing said support and bead axially against each other by pressure applied to the outer side of the bead and at the same time bending a wall of one of said recesses into the other recess.

8. A method of applying a longitudinally arcuate and recessed bead to a longitudinally arcuately recessed tire cover or the like support, comprising the steps of placing the bead and support with their recesses concentric and forcing said support and bead axially against each other by pressure applied to the outer side of the bead and at the same time bending a wall of one of said recesses into the other recess to such an extent as to clamp the inner wall of said other recess between the walls of said one recess.

9. The method of attaching a longitudinally arcuate bead to a support having distortable retaining means projecting from the support in a longitudinally arcuate arrangement, comprising the steps of springing the bead onto said means so as to extend between said means and the support in spaced relation to the support, and pressing the bead and means toward the support to such an extent as to distort said means toward and into biting engagement with the bead and retain said means so distorted while the bead and support are assembled.

10. In combination, a support member comprising a tire cover or the like having retaining means, a longitudinally arcuate bead of arcuate cross-section with one edge portion serving as a retaining means formed to be interlocked with the aforesaid retaining means, and with the other edge portion adjacent said support, one of said means being permanently distortable and distorted, upon application of pressure on the bead toward the support, into biting engagement with the other means with said other edge portion disposed against said support.

11. In combination, a support having retaining means in an arcuate formation, a bead in the form of a split ring shielding and interlocked with said means with the ends of the ring adjacent each other, said means including a distortable portion distorted into biting engagement with both of said ends to hold them in alinement with each other.

GEORGE ALBERT LYON.